United States Patent [19]
Paul

[11] Patent Number: 5,883,695
[45] Date of Patent: Mar. 16, 1999

[54] METHOD AND APPARATUS FOR PRODUCING STEREOSCOPIC IMAGES WITH SINGLE SENSOR

[76] Inventor: Eddie Paul, 414 W. Walnut Ave., El Segundo, Calif. 90245

[21] Appl. No.: 934,268

[22] Filed: Sep. 19, 1997

[51] Int. Cl.⁶ .................................................. G03B 21/32
[52] U.S. Cl. ............................. 352/43; 352/86; 353/10; 359/478; 348/44
[58] Field of Search ........................... 352/43, 86; 353/10; 359/22, 23, 25, 26, 478, 479; 348/44

[56] References Cited

U.S. PATENT DOCUMENTS

| | | |
|---|---|---|
| 1,282,073 | 10/1918 | Hahn . |
| 1,602,251 | 10/1926 | Quidor et al. . |
| 2,002,090 | 5/1935 | Ives ............................................. 352/43 |
| 3,784,738 | 1/1974 | Natter . |
| 3,815,979 | 6/1974 | Collender ................................... 352/43 |
| 4,303,316 | 12/1981 | Mc Elveen . |
| 4,547,050 | 10/1985 | Collender ................................... 352/43 |
| 4,669,812 | 6/1987 | Hoebing ................................... 350/3.73 |
| 4,754,327 | 6/1988 | Lippert . |
| 4,807,024 | 2/1989 | McLaurin et al. . |
| 4,966,436 | 10/1990 | Mayhew et al. ........................... 352/62 |
| 5,151,821 | 9/1992 | Marks . |
| 5,640,222 | 6/1997 | Paul . |
| 5,678,089 | 10/1997 | Bacs, Jr et al. ............................. 352/86 |

*Primary Examiner*—Russell Adams
*Attorney, Agent, or Firm*—John E Vanderburgh

[57] ABSTRACT

Method and apparatus for producing stereoscopic images for motion picture or TV using a single sensor or camera and a single lens. In carrying out the method of the invention, the camera lens is caused to rotate about an axis defined by the optical path of the incoming image rays. The apex of the cone is defined by the object being rendered. The base of the cone is defined by the image sensor portion of the camera and its circular path remains unchanged during an image rendering session. The lens of the camera, on the other hand, travels in a smaller circular path and the circumference of the path of travel of the lens is increased or decreased depending on the distance from the image to the lens and can change during the image rendering session. Apparatus comprises a frame which is driven by an electro mechanical drive mechanism for moving a camera support body through a conical path. The drive mechanism functions to drive the frame for moving a first portion of the camera support body through a circular path which remains generally constant during an image rendering session and a second portion of the camera support body through a smaller circular path which is determined by the distance from the lens to the image which is at the apex of the cone.

18 Claims, 7 Drawing Sheets

METHOD AND APPARATUS FOR PRODUCING STEREOSCOPIC IMAGES WITH SINGLE SENSOR

FIELD OF THE INVENTION

This invention relates to the production of stereoscopic images and more particularly to the apparatus and method for producing stereoscopic images using a single sensor.

BACKGROUND OF THE INVENTION

Systems for producing stereoscopic images, that is images which appear to have depth when viewed generally consist of a method and/or apparatus for creating two images which are recorded from different perspectives so that when displayed one eye sees one perspective of the image and the other eye sees a different perspective of the image. Most commonly this is accomplished by the utilization of two or more cameras which are spaced apart and which record an image from different perspectives. The images form each camera are then disposed side by side, such as on film or on a cathode ray tube. Means, such as polarized or photopic/scotopic glasses, special screens or special apparatus for timing the display of the left and right images, are provided so that the left eye sees only one image and the right eye sees only the other image while to the viewer the image appears to have depth. An example of such a system is found in U.S. Pat. No. 3,784,738 issued Jan. 8, 1974 to Howard Natter. The subject matter of the '738 patent relates to the production of stereoscopic video images employing an image displacer which creates two images as viewed from different perspectives. As an alternative, Natter may employ two spaced apart video cameras to create two images of the scene. Special headgear having spaced apart viewing windows so that only one eye can view one image is required for viewing the stereoscopic images. The system relies heavily on the fact that the images must be perfectly synchronized when 12 shot and when viewed to avoid image deterioration.

Similarly, U.S. Pat. No. 4,303,316, issued Dec. 1, 1981 to Robert McElven, discloses a two-camera system for recording left and right perspectives of a scene. The images are combined on a film strip in a sequence of left and right views with non-moving parts of the scene superimposed. In this manner stereoscopic images on a two dimensional surface can be seen with the unaided eye. As an alternative, a single camera having a shutter that alternately records left and right perspectives of the scene can be used.

Other systems employing several cameras or optical means for creating left and right image perspectives which are then displayed alternatively to create a stereoscopic effect are disclosed in U.S. Pat. No. 3,251,933, issued May 17, 1966 to H. E. Beste; U.S. Pat. No. 4,523,226, issued Jun. 11, 1985 to Lipton, et al.; U.S. Pat. No. 5,142,642, issued Aug. 25, 1992 to H. Sudo; and U.S. Pat. No. 4,751,750 issued Jun. 14, 1988 to M. Robinson.

Another method for producing stereoscopic images on a two dimensional display involves moving the camera and image with respect to one another to produce stereoscopically related images. These images can be displayed sequentially to provide a stereoscopic image without the aid of a viewing device. Alternatively, a viewing device can be used which, in effect, causes the left eye to see a left perspective and the right eye to see a right perspective of the image. These systems allow for the use of a single camera. For example, in U.S. Pat. No. 4,807,024, issued Feb. 21, 1989 to McLauren et al., a single camera is mounted on a moving the platform and the stereoscopically related images are presented alternately to the viewer so that the resulting image is perceived by the viewer as having depth. No special viewing device or glasses is required. U.S. Pat. No. 4,754,327, issued Jun. 28, 1988 to Thomas Lippert, also employs a single camera on a horizontally moving platform for producing left and right perspectives of an image as the camera moves. The image may be displayed as separate frames for the left and right eye to provide depth to the image. The images may be separated by differences in polarity of light or presented sequentially to the left and right eye of the viewer.

As an alternative to moving a camera with respect to the image, moving mirrors can be utilized to essentially move the image with respect to the lens so that alternate perspectives of the image are recorded. For example, U.S. Pat. No. 4,723,159, issued Feb. 2, 1988 to Donald Imsand, combines a reference camera and a moving dynamic camera to produce stereoscopic images. As an alternative to moving the dynamic camera, Imsand may utilize rotating mirrors to create the effect of moving the dynamic camera, although two cameras are required.

U.S. Pat. No. 5,151,821, issued Sep. 29, 1992 to Mortimer Marks, uses the horizontal movement of pair of mirrors arranged at an angle to deflect the image onto the lens of a single camera to create different perspectives of an image as the mirrors move. These images may then be viewed as a stereoscopic image through photopic/scotopic filters. The images appear as conventional two-dimensional images when viewed without the filters.

While the foregoing mirror arrangement does allow for the use of a single camera, the mirrors traveling in a generally horizontal fashion result in dead spaces in the film when the mirrors complete travel in one direction and begin traveling in the opposite direction. Mortimer recognized this problem and disclosed in one embodiment of the invention, a dual camera arrangement utilizing dual sets of moving mirrors so that images were recorded only when the mirrors were moving in one direction. In this manner, the mirrors may be moving from left to right for one camera which is in the recording mode while second camera is shut down to allow its mirrors to return to the left position. When the mirrors of the one camera reach the full right of travel, it shuts down and the second camera begins recording and its mirrors begin moving left to right. In application Ser. No. 617,478, filed Mar. 15, 1996 by Eddie Paul, the problem of dead spots was overcome by the provision of apparatus which is attached to a single, conventional camera. This apparatus comprises a pair of spaced apart mirrors which rotate about the longitudinal axis of the lens and which are arranged to deflect the image from one mirror to the second mirror and thence to the lens to achieve a stereoscopic image.

The use of moving mirrors, either in a circular path or in a horizontal path, provides several disadvantages. First, the use of moving mirrors causes light loss of one f stop or more resulting in a loss of about five to fifteen percent of the available light. In addition, the lens cannot be utilized in a wide angle since the image would be wider than the mirrors at certain points of the rotation. Vibration is also amplified as well as any distortion in either of the mirrors or distortion due to imperfect mounting or travel of the mirrors.

SUMMARY OF THE INVENTION

It is an object of the present invention, therefore, to provide method and apparatus for the production of stereoscopic images utilizing a single lens to produce high quality stereoscopic images without the use of mirrors and the attendant disadvantages thereto.

Another object of the present invention is to provide apparatus which accommodates conventional camera bodies and lenses without the necessity of adapting the cameras and the lenses for utilization for the production of stereoscopic images.

The foregoing objects are achieved by the present invention which provides novel apparatus for use with a conventional video or motion picture camera utilizing a single lens to record stereoscopic images on film or electronic means or by broadcast in real time. The present invention allows for the use of a single lens in a conventional camera body to produce high quality stereoscopic images without the problems involved with the use of moving mirrors as discussed above. In addition the images, when viewed unaided are enhanced in picture quality as contrasted to the same images taken without the apparatus of the present invention.

As used herein, the terms "producing" or "produce" shall refer to the process of recording an image on film or tape or for live broadcast of the image in the case of television. The term "camera" refers to both conventional motion picture cameras which normally employ film and to video cameras and other electronic image producing devices in which the image is electronically recorded or broadcast to remote receivers.

In accordance with the method of the invention, the camera lens is caused to rotate about an axis defined by the optical path of the incoming image rays. The apex of the cone is defined by the object being rendered. The base of the cone is defined by the image sensor portion of the camera and its circular path remains unchanged during an image rendering session. The lens of the camera, on the other hand, travels in a smaller circular path and the circumference of the path of travel of the lens is increased or decreased depending on the distance from the image to the lens and can change during the image rendering session. The closer the image is to the lens, the smaller the circumference of the lens travel path. The image sensor may comprise film, electronic recording means, such as tape, or may constitute means for broadcasting or relaying an image to a remote location.

In a preferred embodiment of the invention the conical movement is achieved by apparatus comprising a support member which is driven by an electro mechanical drive mechanism for moving the support member through a conical path. The drive mechanism functions to move a first portion of the support member through a circular path which remains generally constant during an image rendering session and a second portion of the support member through a smaller circular path which is determined by the distance from the lens to the image which is at the apex of the cone. The first portion of the support member preferably is located for carrying the portion of the camera body where the image sensor is located while the second portion is located for carrying the portion of the camera body at which the lens is located. The support member is mounted on the drive mechanism in a way which permits it to swing and tilt as it travels through the respective first and second circular paths. Electronic means are provided to set the diameter of the first and second circular paths as well as the speed of rotation of the camera mount.

In a preferred embodiment of the invention the drive mechanism carries a lens focus mechanism for adjusting the focus of the lens as the image draws nearer or further from the camera. This mechanism can be utilized to manually adjust the focus of the lens or may be motor driven for remote control of the lens focus.

Maximum stereoscopic effect is achieved by viewing the images produced in accordance with the invention through photopic/scotopic filters. These filters are conventionally supplied in glasses having light and dark lenses.

Other advantages and features of the present invention will become apparent from the following detailed description of the invention taken in conjunction with the drawings in which:

DESCRIPTION OF THE PREFERRED EMBODIMENT OF THE INVENTION

Figure 1:
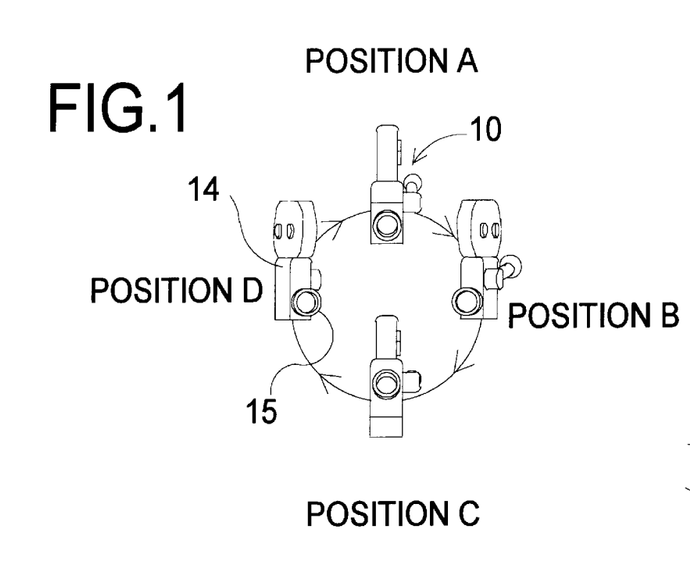
FIG. 1 is a schematic view as seen from the object illustrating the movement of the sensor in accordance with the method of the present invention.
Figure 2:
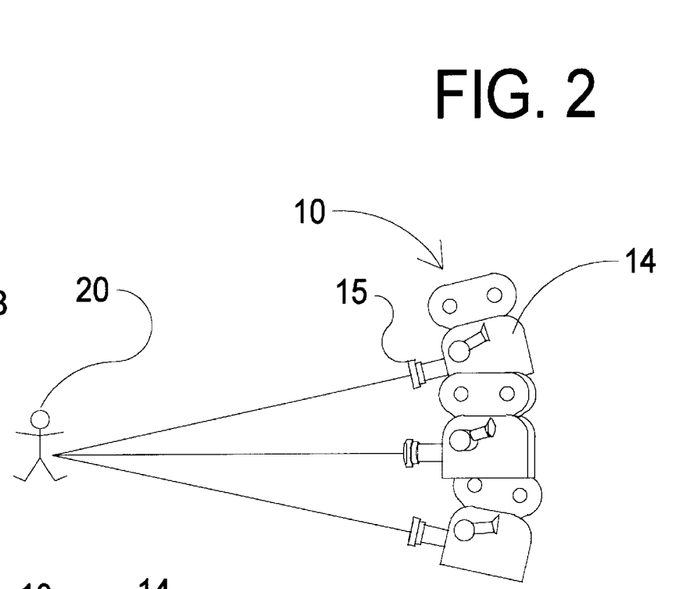
FIG. 2 is a schematic side view of FIG. 1.
Figure 3:
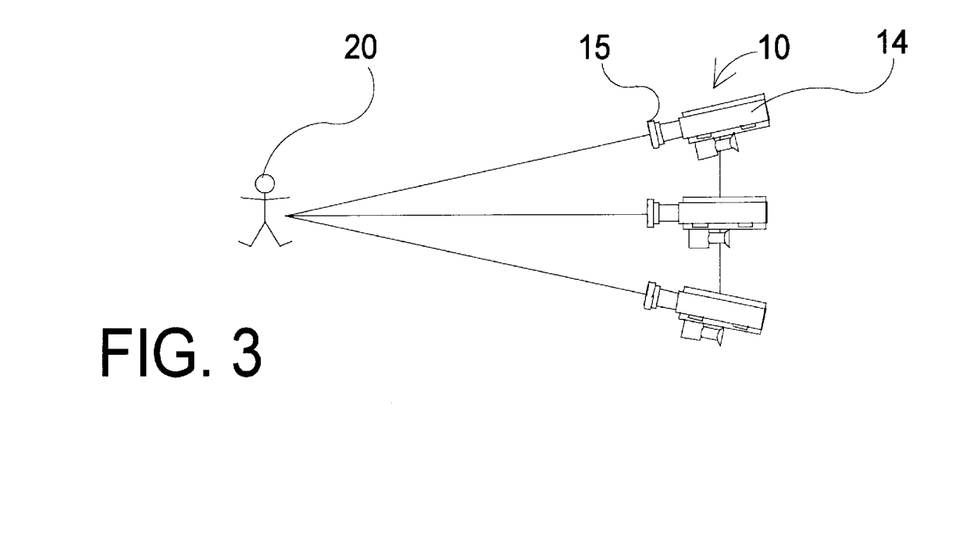
FIG. 3 is a schematic top view of FIG. 1.

Referring to FIGS. 1, 2, and 3, stereoscopic images are created in accordance with the present invention utilizing a moving camera 10 which travels generally in a conical path about an axis defined by a line from an object 20 to the center of the conical path of the camera. The camera 10 may consist of any conventional motion picture camera or video camera having a camera body 14 containing image sensing means, including such image sensors as film or video tape. In addition, the image sensor may broadcast or relay the image to a remote location. The camera body 14, as is conventional, includes a front portion carrying a lens 15 which is directed at an object 20 when producing an image of that object and an opposed rear portion.

Figures 4, 5:
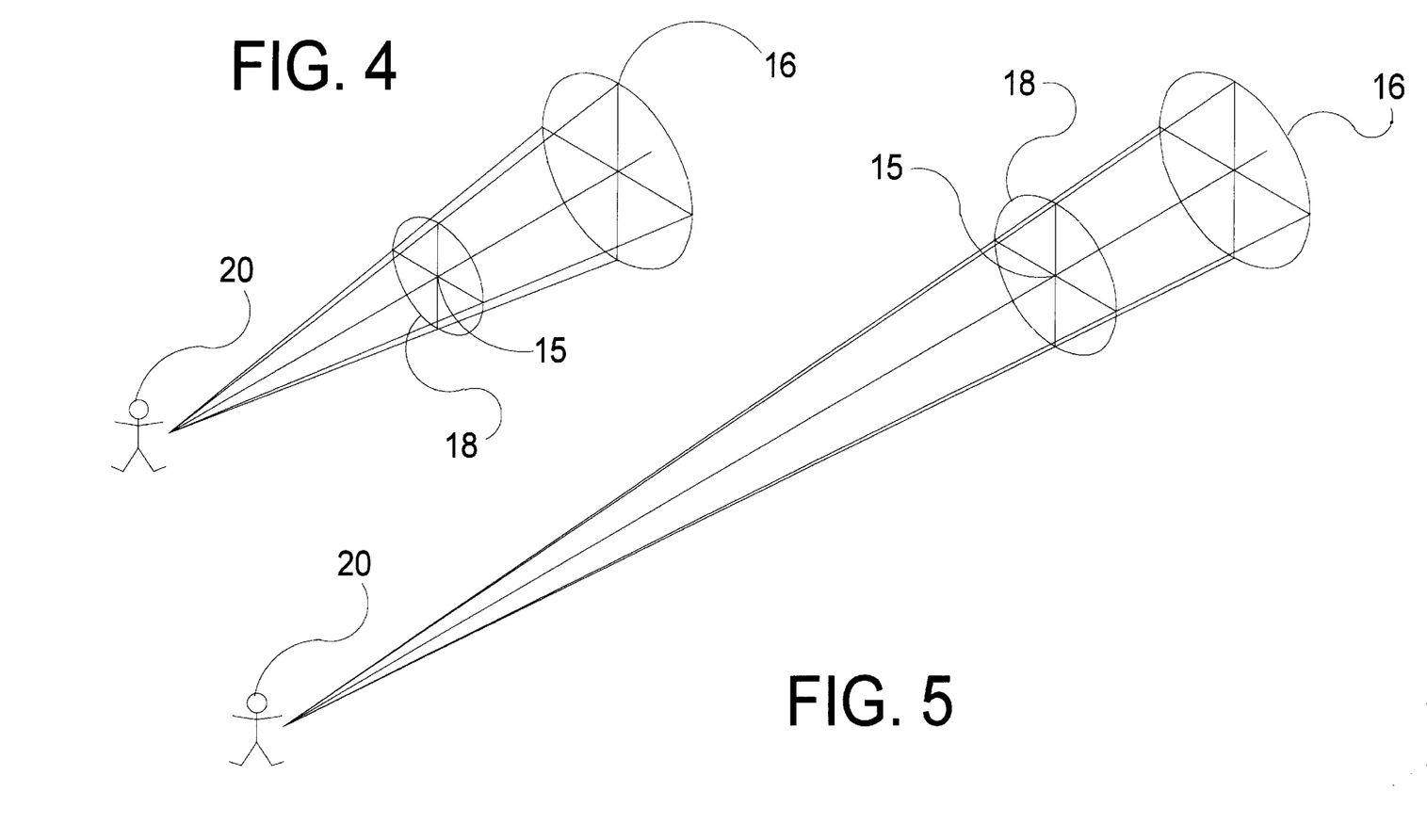
FIG. 4 is a schematic perspective illustrating the conical movement of the image sensor and lens with the object at about 12 feet from the lens.
FIG. 5 is a schematic perspective view illustrating the conical movement of the image sensor and lens with the image at infinity.

As shown in FIGS. 4 and 5 the camera body 14 is moved in a conical path defined by a base circular path 16 and a lens 15 circular path 18. The circumference of the base path 16 is essentially constant during a producing session while the circumference of the lens path 18 is smaller and can change during the image producing session depending on the range from the camera 10 to the object 20. Simultaneously, the camera 10 is swung and tilted to maintain the object 20 within the view of the lens 15 as shown in FIGS. 2 and 3 and to allow the lens portion of the camera 10 to travel in a smaller circumference path than the back portion of the camera. As illustrated, when the camera 10 is in position A at the top of its conical path, the camera 10 is tilted down. As the camera 10 rotates to position B, the camera returns to a horizontal position and is swung inwardly. At the bottom of the circular path the swing of the camera 10 is returned to its neutral swing position parallel to the axis of rotation and the camera is tilted upwardly and at position B the camera swings inwardly and the tilt is returned to neutral. As can be seen in FIG. 2, tilt refers to the angle formed between the longitudinal axis of the lens 15 and a horizontal plane. Likewise, as is illustrated in FIG. 3, the swing of the camera refers to the angle formed between the longitudinal axis of the lens 15 and a vertical plane. As illustrated, in positions B and D the tilt of the camera is essentially zero while in positions in positions A and C the tilt of the camera is greatest depending on the distance from the object 20 to the center of the cone base. Likewise in positions B ad D the swing of the camera 10 is maximum and positions A and C the swing is essentially zero. At intermediate positions about the path of travel the camera 10 will be subjected to combinations of swing and tilt.

As mentioned, the circumference of the lens path 18 depends upon the distance of the object 20 from the lens. The object 20 is located at the apex of the cone. As shown in FIG. 4 the object 20 is located close to the lens 15 of the camera 10 and the lens path 18 is considerably smaller than the base 24 of the cone, that is the path traveled by the back end 22 of the camera body 14. As shown in FIG. 5 the object 20 is represented as being at infinity and the lens circular path 18 is only slightly smaller than the path traveled by the back end 22 of the camera 10 which defines the base path 16 of the cone. Good results have been achieved when the base path 16 is maintained at a diameter of 4" which permits apparatus constructed in accordance with the invention, described hereinafter, to be compact and light weight. The camera 10 may be moved in a clockwise or counter clockwise position to achieve the production of stereoscopic images. By way of example, the table set forth below illustrates the variation in the diameter of the lens circular path 18 in relation to the distance from the lens 15 to the object 20. The distance between the base circular path 16 and lens circular path is assumed to be 12 inches.

TABLE

| Dist to Object/Ft | 5 | 10 | 20 | 30 | 60 | 120 | 240 | 960 |
|---|---|---|---|---|---|---|---|---|
| Base Circular Path Dia./in. | 4 | 4 | 4 | 4 | 4 | 4 | 4 | 4 |
| Lens Circular Path Dia./In. | 3.2 | 3.6 | 3.8 | 3.9 | 3.95 | 3.97 | 3.988 | 3.998 |

The speed of rotation is not critical and may range between 0.4 RPM to as much as 5 RPM. The speed, however, may be adjusted for different effects. As rotation speed of the camera 10 is increased a strobing effect can be noticed, particularly during a rapid camera pan. Strobing is a blurring or pulsating of the image which is caused by differences in the relative speed between the moving camera 10 and a moving image. For example, if the camera 10 is moving in a clockwise direction and an image is entering the frame from the left (right side of FIG. 1) the relative speed between the image and the camera at position C will be substantially less than the relative speed between the image and the camera in position A. If the object 20 is moving at a speed equivalent to a film speed of 10 frames per second and the camera 10 is moving at 8 feet per second, the object passing the camera at position C is only moving 2 frames per second with respect to the lens 24 of the camera 10. At position A, however, the object 20 is moving at 18 frames per second relative to the lens 15 of the camera 10. This is nine times faster past the film plane and, if the film is moving at a speed of 24 frames per second and each frame includes a span of 10 feet of the object 20, each frame of film will show an offset of the object 20 of 1.33 feet. This could cause a blur or strobing of the shot. Adjusting the rotation speed of the camera 10 will compensate for the speed of the image and the relative image to lens speed is thus adjusted to eliminate the strobing or blurring effect.

Figure 6:
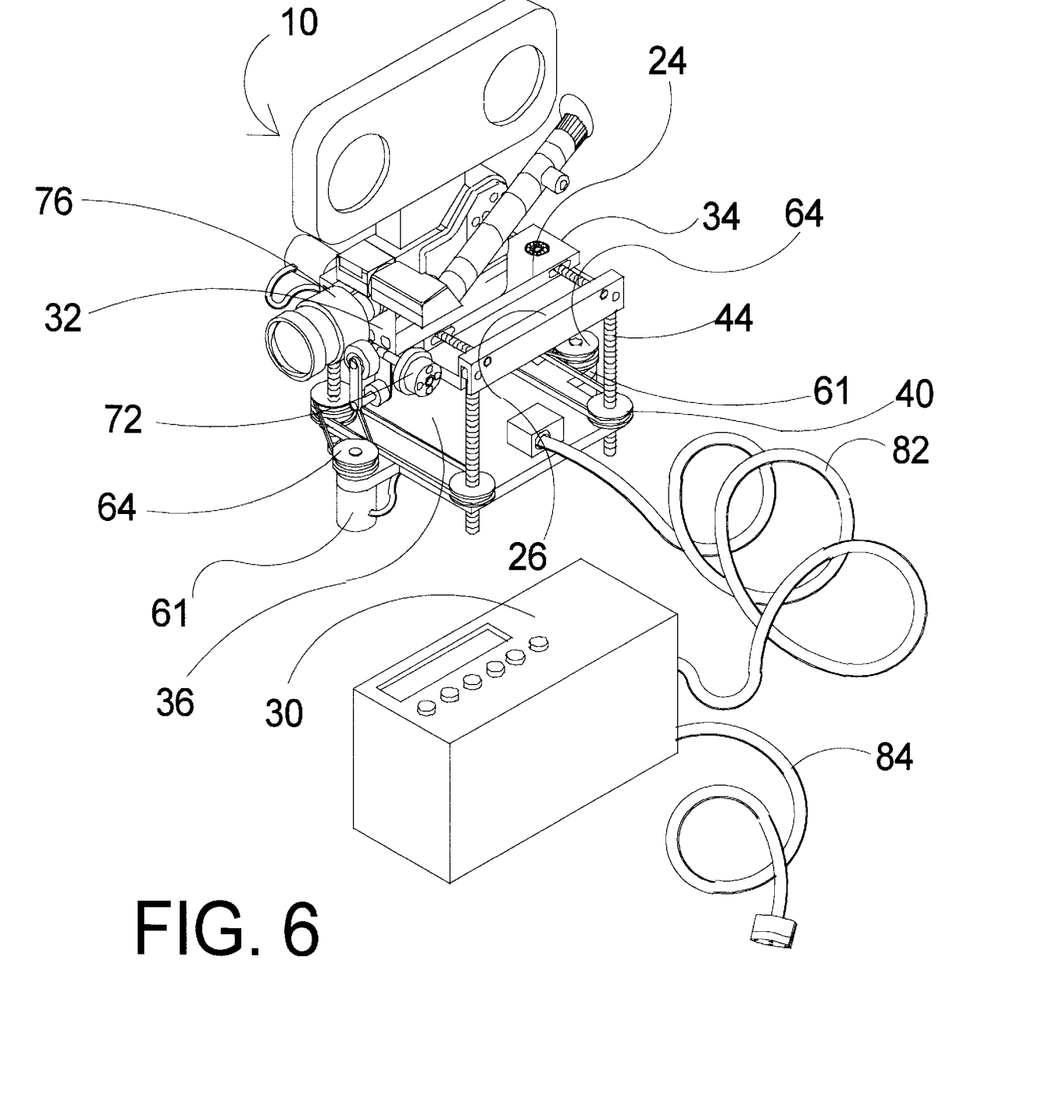
FIG. 6 is a perspective view of a conventional camera and apparatus for moving the camera in accordance with the present invention.

An apparatus suitable for producing stereoscopic images in accordance with the present invention is illustrated generally in FIG. 6 in which a motion picture camera 10 using film as the image sensor is mounted on a support member 24 which defines a front edge 32 and a rear edge 34. The support member 24 is carried by a frame 26 for vertical and horizontal movement to impart a circular movement to the camera 10. The frame 26 is provided with two drive mechanisms so that the front edge 32 and rear edge 34 of the support member 24 are free to travel in separate concentric circles having different diameters thus defining the conical pattern for the camera rotation. The support member 24 is mounted on the frame 26 for biasing movement with respect to the horizontal and vertical axes of the frame. In this manner the support member 24 is free to swing and tilt to accommodate the dissimilar diameters of the lens travel path 18 and the base travel path 16 of the camera. Each drive mechanism is electronically connected to a control board (not shown) which carries connectors for the power supply (not shown) and a connector to a CPU 30 for programming an EPROM on the control plate with the commands for the drive mechanism. A control cable 82 connects the control board 28 with the CPU 30 and a power cord 84 is connected to a source of power (not shown).

Figure 7:
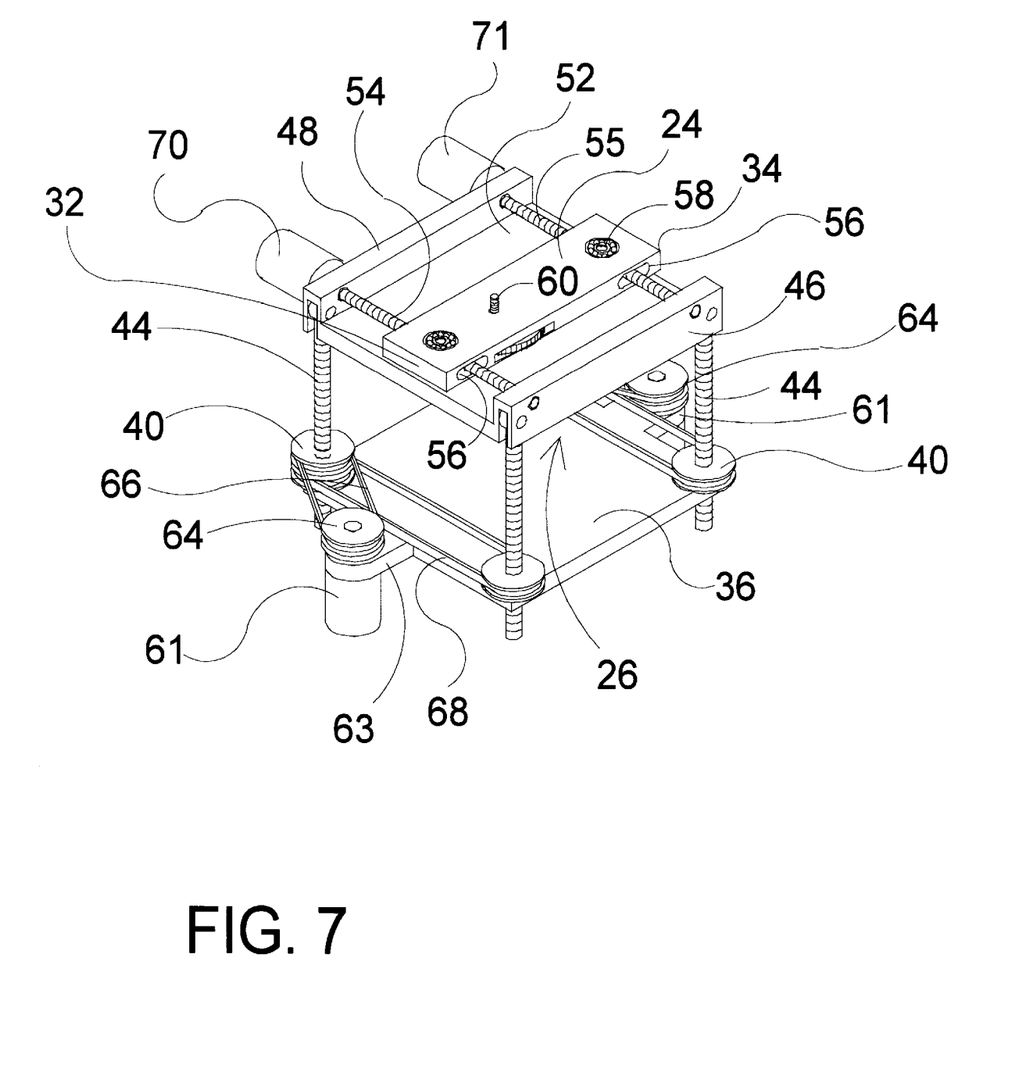
FIG. 7 is a perspective view of the apparatus for moving the camera of FIG. 6.
Figure 8:
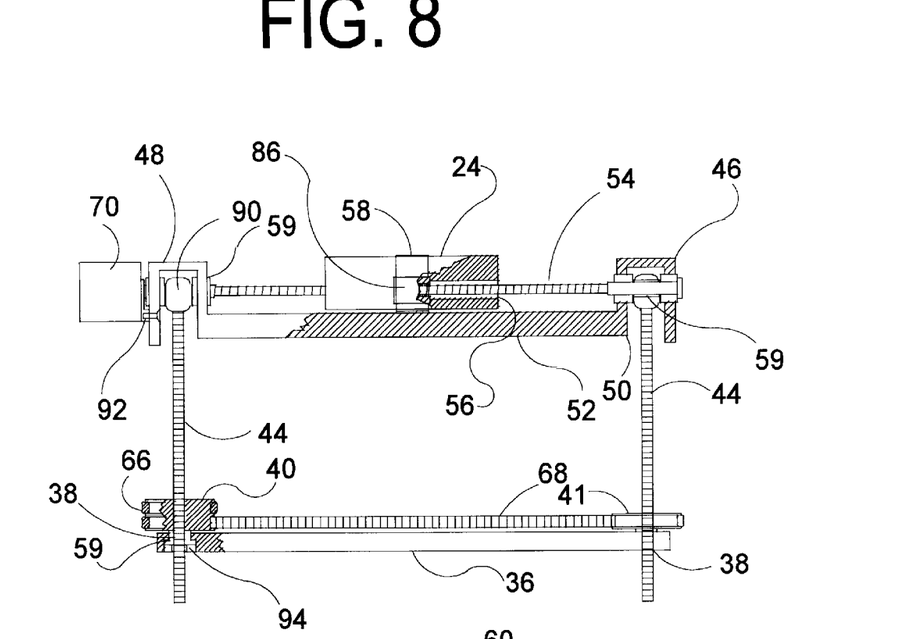
FIG. 8 is a front elevation, partially in section, of the apparatus of FIG. 6.
Figure 9:
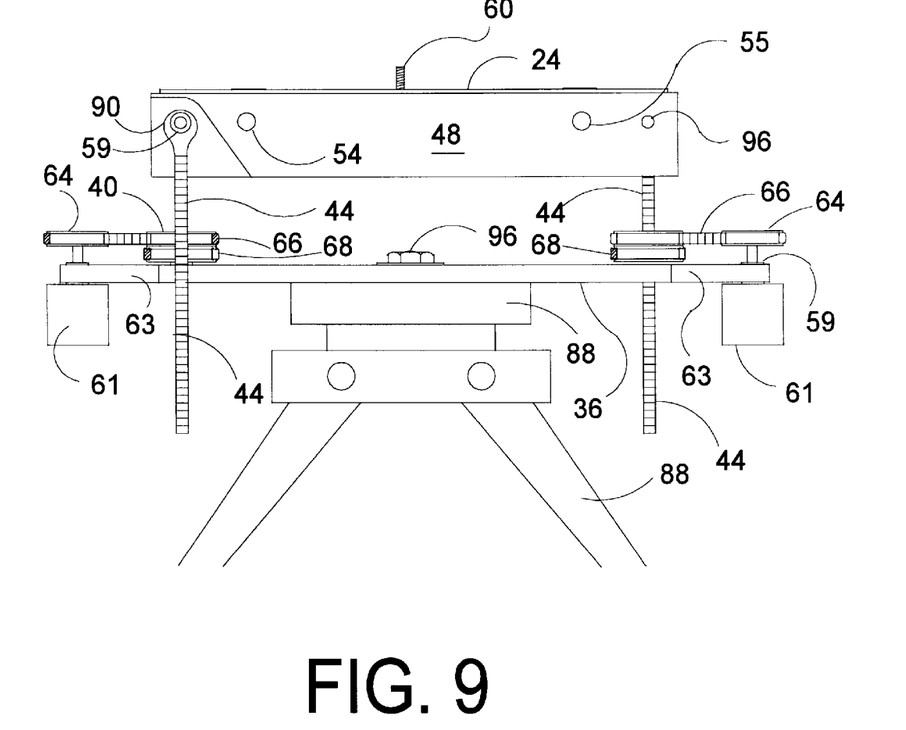
FIG. 9 is a side view, partially broken away, of the apparatus of FIG. 6.

As shown in more detail in FIGS. 7, 8, and 9, the frame 26 comprises a base plate 36 having an opening 38 at each corner over which a idler pulley 40 having a threaded central opening is journaled with the threaded central opening aligned with the opening 38 in the base plate. Extending through the aligned openings of the base plate 36 and idler pulley 40 are four threaded upright members 44 arranged as a forward pair and a rear pair. The upper ends of the threaded upright members 44 are journaled in downwardly opening channel members 46 and 48 which are formed on the longitudinal edges 50 of an upper plate 52. A front transverse threaded shaft 54 and a rear transverse threaded shaft 55 are journaled in the channel members 46 and 48. The front transverse shaft 54 is located adjacent the front pair of threaded uprights 44 and the rear transverse shaft 55 adjacent the back pair of threaded uprights. Each transverse threaded shaft 54 and 55 extends through the channel member 48 for connection to a drive mechanism as will be explained below.

Figure 10:
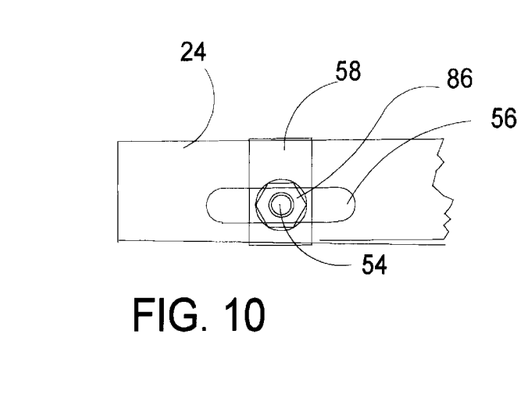
FIG. 10 is a side view of camera support member, in enlarged scale and partially broken away for compactness of illustration, illustrating the mount for the transverse shaft of FIG. 7.
Figure 11:
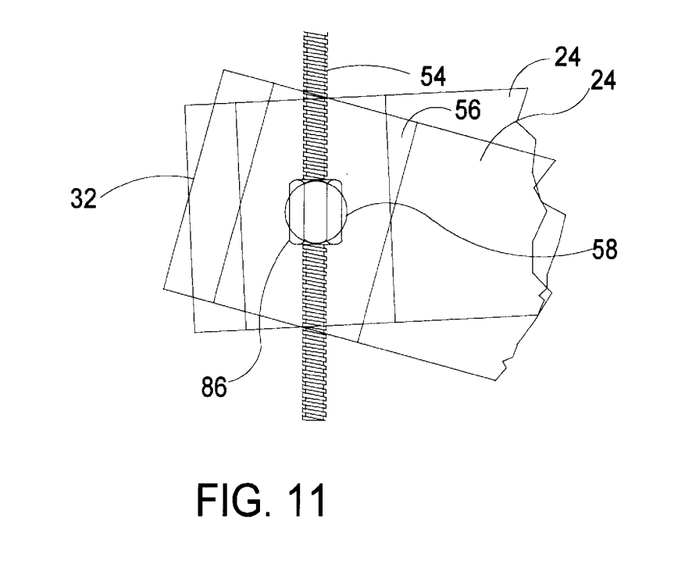
FIG. 11 illustrates the swing feature of the mount of FIG. 10.

The support member 24 is provided with a forward and a rear pair of transverse through-running, elongated passages 56. The transverse shaft 54 extends through the forward pair of passages 56 and the rear transverse shaft 55 extends through the rear pair of elongated openings. As is most clearly shown in FIGS. 10 and 11, a spool 58, in which is pressed a nut 86, is provided within each of the elongated passages 56 to drive the support member 24 transversely in response to the rotation of the horizontal threaded shafts 54. The spool 58 is journaled so that it is free to pivot horizontally within its respective passage 56 to allow the support member 24 to swing relative to the transverse shafts 54 and 55. The swinging action permits in combination with the vertical motion allows the camera 10 to travel in a conical path with the rear portion of the camera describing the larger diameter base path 16 while the lens 15 describes the smaller lens travel path 18. The through-running passages 56 are longitudinally elongated to provide the necessary clearance for the horizontal shafts 54 as the support member 24 swings to the left and to the right during travel. An extending machine screw 60 is provided for securing the camera 10 on the support member 24.

The front and back pairs of the threaded uprights 44 are independently driven by separate but identical drive mechanisms mounted on supports 63 carried by the front and rear transverse edges of the base plate 36. Each of the front and rear drive mechanisms consists of a servo motor 61, a drive pulley 64, upper and lower stacked idler pulleys 40 mounted at one front and rear corner of the base plate 36, and a single idler pulley 41 mounted at the other front and rear corner of the base plate. The drive pulley 64 is connected to the upper stacked idler pulley 40 by a drive belt 66 and the lower stacked idler pulley is connected by a belt 68 to the single idler pulley 41.

The front transverse threaded shaft 54 and rear transverse threaded shaft 55 are each separately directly driven by servo motors 70 and 71 respectively.

In operation the drive mechanism for the front portion 32 and rear portion 34 of the frame 26 are separately programmed to describe the base circular path 16 and the lens circular path 18 by an EPROM located on the control board 28. By controlling the horizontal travel of the transverse shaft 54 and the vertical travel of the front pair of upright shafts 44, the forward portion of the frame 26 is caused to describe the lens circular path 18. Similarly, controlling the horizontal travel of the rear transverse shaft 55 and the vertical travel of the back pair of upright shafts 44 controls the circular motion of the rear portion 34 of the frame 26 which describes the base circular path 18. The combined horizontal and vertical movements produces the circular path. The servo motor 61 is activated to rotate in one direction to cause the front pair of threaded shafts 44 to move downwardly responsive to the rotation of the drive pulley 64 and the idler pulleys 40 and 41 moving the front edge 32 of the support member 24 downwardly with respect to the base plate 36. At the programmed bottom of travel, the servo motor 61 is reversed causing the pulleys 64 and 40 to rotate in the opposite direction and causing the uprights to raise the front edge 32 of the support member 24 away from the base plate. Simultaneously the servo motor 62 is activated to rotate the transverse threaded shaft 54 causing the support member 24 to move in a horizontal direction. At the end of the desired travel in one direction, the servo motor 62 is reversed causing the support member 26 to reverse the direction of its horizontal travel. The combined horizontal and vertical travel of the support member 24 carries the lens 15 of the camera 10 in a circular path which defines the lens circular path 18. The base circular path 16 is defined by the combined vertical and horizontal movement of the support member 24 produced by the rear pair of upright members 44 and the rear transverse threaded shaft 55 comprising the rear portion 34 of the frame 26. The camera 10 thus moves in a conical path due to the difference in the diameter of the base circular path 16 and the lens circular path 18. As the lens and back sections of the frame 26 travel in circular paths of different diameters, the pivoting spool 58 in the elongated passages 56 of the support member 24 permits the support member to swing so that the camera 10 can travel smoothly through a conical path and so that the lens 15 can keep the object 20 in view.

Figure 12:
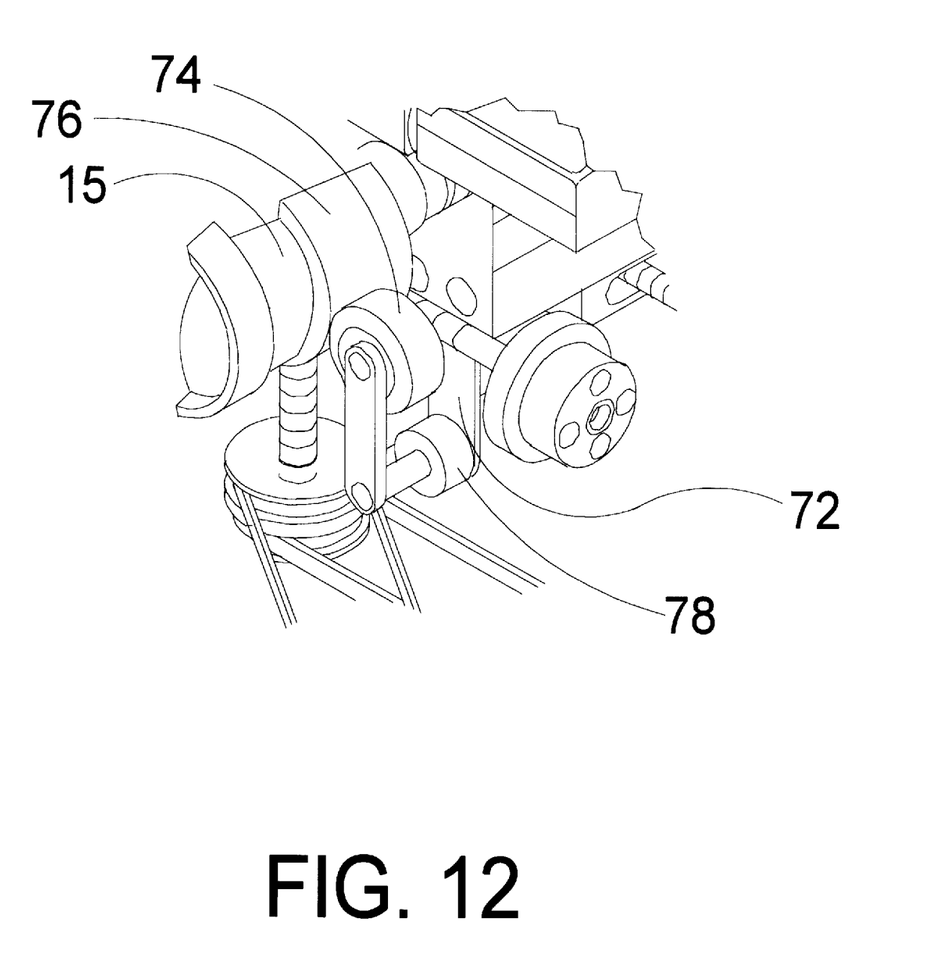
FIG. 12 is a portion of the apparatus of FIG. 5 in enlarged scale, partially broken away for compactness of illustration, illustrating a focusing mechanism for the device of FIG. 6.

As mentioned, in a preferred embodiment of the invention, a focusing mechanism 72 for the lens 15 is provided for remotely changing and displaying the lens settings. Referring to FIG. 12, one embodiment of such a mechanism comprises a roller 74 which is in frictional contact with the focusing ring 76 of the lens 15. The roller 74 is in driving contact with a potentiometer 78 by suitable means such as frictional contact or by a drive belt or similar mechanical arrangement for moving the wiper of the potentiometer in response to the rotation of the roller. The position of the focusing ring 76 is translated to the potentiometer 78 through the roller 74 causing a change in the output of the potentiometer. The output of the potentiometer 76 is calibrated for the various focal lengths of the lens 15. As the lens 15 is focused, the focusing ring 76 causes the roller 74 to move the contact of the potentiometer 78 which changes its output to the CPU 30. The CPU 30 converts the signal from the potentiometer 78 to a readable format for the operator or for recording in memory. A keyboard (not shown) is provided for inputting focus change commands to the CPU 30. The focus readout can also be converted by the CPU 30 into commands for the control board 28 controlling the servo motors 61 and 62 so that as the focus changes, the output signal from the potentiometer 78 through the CPU 30 is converted to a command which can change distance traveled by the pair of uprights 44 and the front transverse threaded shaft 54. In this manner the lens circular path 18 can be varied depending upon the focus of the lens 15. As previously mentioned, as the object 20 becomes closer to the lens 15 the path of travel of the lens 15 is necessarily smaller in order to maintain the object 20 in view.

From the foregoing it will be seen how the method and the apparatus of the present invention accomplish the objects, features and advantages of the present invention. As will be understood in the art, however, various arrangements which lie within the spirit and scope of the invention other than those described in detail in specification will occur to those persons. It is therefore to be understood that the invention is to be limited by the claims appended hereto.

Having described my invention, I claim:

1. A method for producing stereoscopic images utilizing a single lens image sensing means optically aligned with said single lens for rendering an object, said method comprising the steps of:

a. training said single lens on an object;

b. focusing said single lens on said object thereby to produce an image of said object on said image sensing means;

c. causing said lens to orbit in a circular path about an axis defined by a line from said object to the center of said circular path to define a lens circular path;

d. simultaneously causing said image sensing means to orbit in a separate coaxial circular path about said axis while maintaining optical alignment with said single lens thereby to define a base circular path, the diameter of said base circular path being greater than the diameter of said lens circular path; and e. swinging and tilting said single lens as said single lens describes said lens circular path;

whereby said base circular path and said lens circular path define a virtual cone with said object forming the apex thereof.

2. The method of claim 1 wherein said lens and said image sensing means are disposed within a camera housing, said housing defining a first portion carrying said lens and a second portion containing said image sensing means, moving said first portion of said housing to cause said lens to travel in said lens circular path and simultaneously moving said rearward portion of said housing to cause said image sensing means to travel in said base circular path.

3. The method of claim 1 wherein the diameter of said lens circular path is directly related to the distance of said object from said single lens.

4. The method of claim 1 wherein the circumference of said base circular path is constant and the circumference of said lens circular path is adjusted depending upon the distance from said object to said lens.

5. The method of claim 1 wherein said image sensing means is video tape for recording electronic images.

6. The method of claim 1 wherein said image sensing means is film.

7. The method of claim 1 wherein said image sensing means comprises circuitry for sensing and relaying said image to a remote location.

8. A method for producing stereoscopic images utilizing a single camera body containing image sensing means, said camera body defining a forward portion carrying a single lens and an opposed rear portion, said method comprising the steps of:
 a. training said single lens on an object;
 b. focusing said single lens on said object thereby to produce an image of said object on said sensing means in said camera body;
 c. rotating said front portion of said camera body carrying said lens in a circular path about an axis defined by a line from said object to the center of said circular path to define a lens circular path;
 d. rotating said rear portion of said camera body in a separate coaxial circular path about said axis to define a base circular path, the circumference of said base circular path being greater than the circumference of said lens circular path;
 e. maintaining the circumference of said base circular path constant and adjusting the circumference of said lens circular path relative to the distance of said object to said lens; and
 f. swinging and tilting said camera body while said camera body describes said lens circular path and said base circular path;
 whereby the rotation of said camera body describes a conical path while said lens is trained on said object and said image is being produced.

9. Apparatus for producing images with a single lens, said images capable of being viewed stereoscopically, said single lens being mounted in a housing in optical alignment with an image sensing means and with an object being rendered, said apparatus comprising:
 a. a housing support body including a first portion disposed for supporting an area of said housing where said image sensing means is located and a second portion disposed for supporting an area of said housing where said lens is mounted; and
 b. a drive mechanism for moving said first portion of said housing support body through a first circular path and said second portion through a coaxial second circular path, said second circular path being of less diameter than said first circular path so that the movement of said lens and said image sensing means in combination define a cone with said first circular path defining the base and said object being rendered being at the apex of said cone.

10. The apparatus of claim 9 further comprising:
 a. said housing support body having at least one transverse through-running, elongated passage, a threaded shaft support mounted in said elongated passage for pivoting about a vertical axis,
 b. a transverse threaded shaft extending through said elongated passage, said transverse shaft being threadably mounted in said shaft support for horizontally movably carrying said housing support body responsive to the rotation thereof, said housing support body being free to rotate about the vertical axis of said shaft support, the amount of rotation being limited by the elongated passages;
 c. a frame comprising an upper plate on which said transverse shaft is rotatably mounted, a base plate defining a forward edge and a rear edge, at least one opening at said forward and said rear edge, at least one pulley having a threaded central opening journaled on said front edge and said rear edge of said base plate, said central opening being aligned with said opening in said base plate to define a vertical shaft drive, a threaded upright member having an extending upper end received in each said corresponding vertical shaft drive, said upper plate being carried by the extending upper ends of said threaded upright members for vertical movement with said extending upper ends of said threaded uprights responsive to the rotation of said pulleys of said vertical shaft support; and
 d. separate drive means for each of said pulleys and said transverse threaded shaft;
 whereby the area of said housing where said image sensing means is located is moved vertically by said rear threaded upright and transversely by said transverse shaft to define a base circular path and said area of said housing where said lens is mounted is moved vertically by said front threaded upright and transversely by said transverse shaft to define a lens circular path of smaller diameter than the base circular path, said housing support body being free to swing about the vertical axis of said shaft support of said transverse shaft to accommodate the difference in diameter of the base and the lens circular path.

11. The apparatus of claim 10 wherein said frame comprises a pair of forward threaded uprights and a pair of rear uprights, one of said threaded uprights being located at each corner of said base plate.

12. The apparatus of claim 11 further including an opening at each corner of said base plate and a corresponding pulley having a threaded center opening which is aligned with said opening in said base plate to define a vertical shaft drive in which a corresponding vertical upright is disposed at each corner of said base plate.

13. The apparatus of claim 10 including a first elongated passage and transverse threaded shaft extending there through in said housing support body carrying the area of said housing where said sensor means is located and a second elongated passage and a second transverse threaded shaft in said housing support body carrying the lens portion of said housing.

14. The apparatus of claim 10 wherein said separate drive means consists of a servo motor and drive pulley for said forward threaded uprights, belt means connecting said servo motor drive pulley and a pulley of one of said vertical shaft mounts for said forward pair of vertical uprights and belt means connecting said pulleys of said vertical shaft mounts for said forward threaded uprights, a servo motor and drive pulley for said rear pair of threaded uprights, belt means connecting said servo motor drive pulley and a pulley of one of said vertical shaft mounts for said rear pair of vertical uprights and belt means connecting said pulleys of said vertical shaft mounts for said rear threaded uprights and a servo motor driving each of said transverse threaded shafts.

15. The apparatus of claim 10 further including a lens focusing mechanism comprising a roller in frictional contact with a focusing ring of said lens, said roller being also in frictional contact with a potentiometer the output of which is calibrated for the various focal lengths of said lens and means for reading the output of said potentiometer to determine the setting of said lens responsive to the position of the focusing ring as sensed by said potentiometer.

16. The apparatus of claim 10 further including control means for controlling said servo motors.

17. Apparatus for the production of stereoscopic images comprising the combination of:
   a. a single camera body having a front end and an opposed back end;
   b. a frame carrying said front end of said camera body for rotation in a first circular path about an axis defined by a line from an object on which said lens is trained to the center of said first circular path and for rotation of said back end of said camera body in a second concentric circular path about said axis, said first circular path having a larger diameter than said second circular path.

18. The apparatus of claim 17 wherein said frame comprises:
   a. a base plate having at least a forward and a rear opening extending there through;
   b. a least a forward and rear threaded upright member having an upper end and a lower end, said lower end of said front and rear threaded upright member extending respectively through said front and rear opening in said base plate, each said upright member being threadibly mounted in a rotatable member journaled on said base plate, said rotatable member having a correspondingly threaded central opening through which said upright member extends, each said upright member moving vertically in a first direction responsive to the clockwise rotation of said rotatable member and in a second vertical direction responsive to the counter clockwise rotation of said rotatable member;
   c. said upper end of said threaded upright members carrying an upper plate for vertical movement responsive to the vertical movement of said threaded upright members;
   d. at least one transverse threaded shaft rotatably mounted on said upper plate;
   e. a camera support plate carried by said transverse threaded shaft for horizontal movement in a first direction responsive to the clockwise rotation of said transverse shaft and in a second opposite direction responsive to the rotation of said shaft in a counter clockwise direction; and
   f. a single lens mounted in said front end of said camera body; and
   g. separate drive means for said rotatable member mounting said front threaded upright member, said rear threaded upright member and said transverse threaded shaft.

* * * * *